May 23, 1961 W. STELZER 2,985,143
FLUID PRESSURE MOTOR MECHANISM
Filed July 1, 1960 2 Sheets-Sheet 1
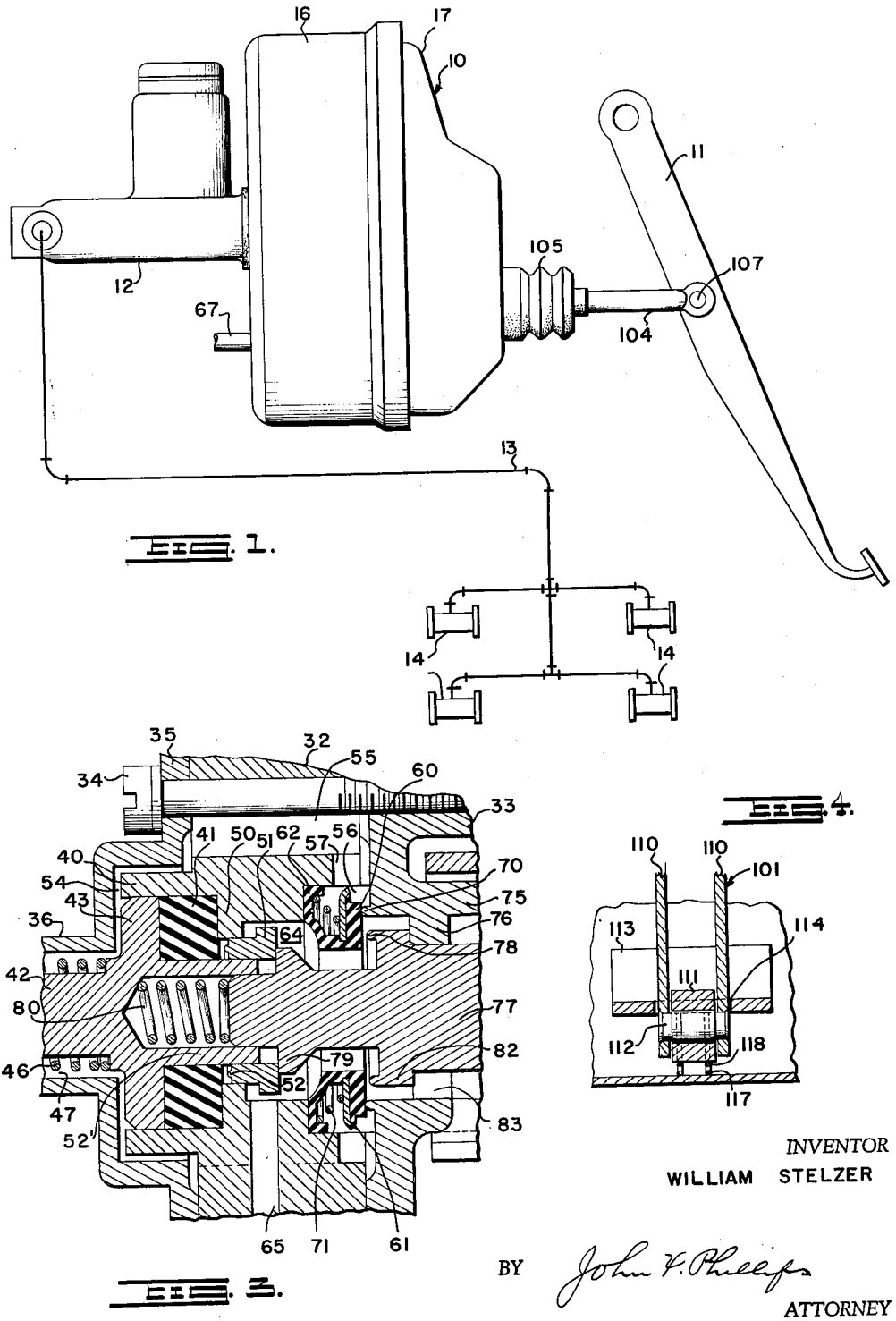
INVENTOR
WILLIAM STELZER
BY *John F. Phillips*
ATTORNEY

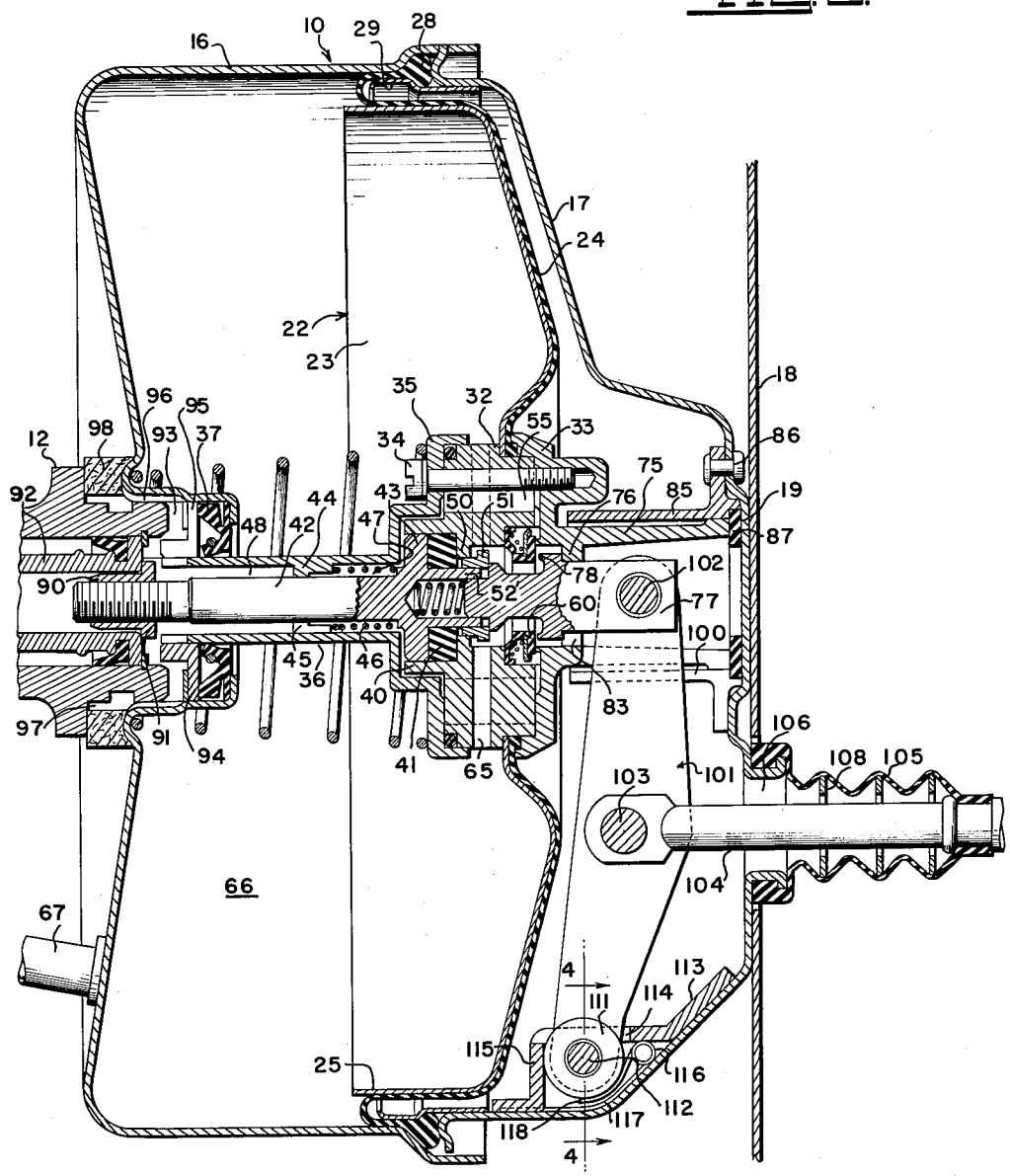

United States Patent Office 2,985,143
Patented May 23, 1961

2,985,143

FLUID PRESSURE MOTOR MECHANISM

William Stelzer, Bloomfield Hills, Mich., assignor to Kelsey-Hayes Company, Detroit, Mich., a corporation of Delaware Filed July 1, 1960, Ser. No. 40,393

14 Claims. (Cl. 121—41)

This invention relates to a fluid pressure motor mechanism, and more particularly to such a mechanism adapted for use as booster means in a motor vehicle brake system.

It has been proposed in booster motor mechanisms for automobiles to provide fluid pressure motors the pressure responsive units of which are adapted to travel such a distance as to adapt them for use with conventional master cylinders. However, it is the common practice in such systems to use a pedal having a total travel distance materially less than is employed with conventional brake systems. It is therefore necessary to provide between the pedal and the control valve mechanism for the motor lever means which permits of the use of a short-travel pedal with the pedal movement multiplied at the valve mechanism to permit the latter to partake of the necessary movement in controlling the motor, the follow-up valve mechanism necessarily moving the same distance as the motor piston. The levers employed for this purpose are usually mounted between the booster motor and the fire wall, thus requiring substantial space on the installation of the booster unit. It is also necessary to provide a pin and slot or linkage arrangement in the lever to compensate for the fact that the valve mechanism partakes of linear movement while the valve operating end of the lever moves arcuately about the pivot axis of the lever.

An important object of the invention is to provide a novel motor mechanism of the type referred to wherein the valve operating lever is mounted within the motor and forms in effect a part thereof and to limit the space required for the booster unit.

A further object is to provide such a motor mechanism wherein a simple type of lever support is provided within and carried by the motor itself, thus eliminating the use of the usual lever supporting bracket between the motor and the fire wall.

A further object is to provide a motor mechanism which is characterized by the absence of atmospheric pressure acting on the control piston, thus obviating the necessity for the static balancing of the control piston, which otherwise requires a sliding or diaphragm type seal.

Other objects and advantages of the invention will become apparent during the course of the following description.

In the drawings I have shown one embodiment of the invention. In this showing—

Figure 1 is a side elevation of the booster unit and master cylinder, the piping connections to the wheel cylinders being diagrammatically shown;

Figure 2 is an enlarged fragmentary axial sectional view through the motor, parts being shown in elevation;

Figure 3 is a further enlarged axial sectional view of the portion in the motor containing the control valve mechanism, and Figure 4 is a detail fragmentary sectional view of line 4—4 of Figure 1.

Referring to Figure 1 the numeral 10 designates a booster motor as a whole forming the principal subject matter of the present invention described in detail below. The valve mechanism for the motor is operated by a conventional preferably depending brake pedal 11. The operation of the motor displaces fluid from a conventional master cylinder 12 connected by lines 13 to the usual wheel cylinders 14.

Referring to Figure 2, the motor 10 comprises a pair of preferably stamped casing sections 16 and 17 the former of which is secured in any suitable manner to the master cylinder 12 coaxially thereof. The casing section 17 is secured by suitable bolts (not shown) to the fire wall 18 of the vehicle, this being the usual position for the mounting of brake booster motors. In the present instance, however, it will be noted that the end wall 19 of the casing section 17 is seated directly against the fire wall, there being no intervening bracket as is usually employed with an apparatus of this character.

Within the motor is mounted a pressure responsive unit indicated as a whole by the numeral 22 and generally comprising a stamped annular shell 23 and a diaphragm 24 the outer portion of which rolls over a flange 25 forming a part of the shell 23. The outer periphery of the diaphragm 24 is provided with an annular bead 28 clamped between the casing sections and held in position by a retaining ring 29.

The pressure responsive unit further comprises an axial preferably die cast body 32 having a cap member 33 secured thereto by screws 34, the inner peripheries of the shell 23 and diaphragm 24 being clamped in position between the members 32 and 33. The screws 34 also clamp in position the flange portion 35 of a power operated tubular member 36 slidable in a combined bearing and sealing unit 37 carried by the hub portion of the casing section 16.

Referring to Figure 3, the axial body 32 is provided with a cylindrical flange 40 within which is arranged a rubber or deformable reaction block 41. A rod 42 is arranged axially in the tubular member 36 and is provided at its right hand end as viewed in Figures 2 and 3 with an annular flange 43 seating against the block 41. The rod 42 slides in a bearing 44 formed in the tubular member 36, such bearing being slotted at one side as at 45 (Figure 2) to form an air passage. A light compression spring 46 is arranged between the bearing 44 and flange 43 as shown in Figure 2. This spring is arranged in an annular space 47 communicating through the slot 45 with a similar annular space 48 to which air is supplied in the manner to be described.

The rubber block 41, as previously stated, is arranged within the flange 40 and seats against the flange 43. This block also seats against an annular flange 50 (Figure 3) formed in the body member 32. Within the flange 50 is arranged an axially slidable reaction ring 51, this ring sliding over a cylindrical flange 52' projecting inwardly from the flange 43. The reaction ring 51 has its end adjacent the block 41 formed with an annular rib 52 engageable with the block 41 upon movement of the ring 51 under conditions to be described.

The chamber 47 communicates through a space 54, which may be formed as grooves in the member 36, through an opening 55 with a chamber 56 formed in the right hand end of the body 32 as viewed in Figure 3. This chamber communicates with the opening 55 as at 57.

Within the chamber 56 is arranged a resilient valve element 60 having a backing ring 61 and provided with a diaphragm 62 integral therewith and sealing the chamber 56 from a chamber 64 formed within the body member 32. This chamber communicates through passages 65 with a constant pressure motor chamber 66 formed between the pressure responsive unit 22 and the casing member 16. Chamber 66 communicates with a source of vacuum, through a nipple 67 fixed to the casing section 16 and connected by a suitable line (not shown)

with a source of vacuum such as the intake manifold of the vehicle engine. It will be apparent that the motor chamber 66 is always connected to the source of vacuum and that vacuum is always present in the chamber 64.

The cap or valve cover 33 is provided with an annular valve seat 70 normally engaging the valve 60, such valve being biased to the right in Figure 3 by a spring 71. This engagement of the valve 60 and seat 70 closes the chambers 56 and 64 to each other when the parts are in the normal off positions.

The cap or cover 33 is provided with a rearward generally cylindrical extension 75 having an internal bearing 76 in which is slidable a valve operating rod 77. This rod is provided with an annular valve seat 78 concentric with and arranged slightly inwardly of the valve seat 70 and engageable with the valve 60 upon movement of the rod 77 to the left in Figure 3. The rod 77 is provided with a flange 79 seating against the adjacent end of the reaction ring 51, and the rod 77 is biased to the right in Figures 2 and 3 by a spring 80 to tend to maintain the seat 78 out of engagement with the valve 60. Movement of the rod 77 to the normal off position is limited by engagement of the bearing 76 with an annular flange 82 on which the valve seat 78 is formed. The bearing flange 76 is slotted as at 83.

A cylindrical guide 85 surrounds and slidably receives the cylindrical extension 75 and is secured as at 86 to the casing section 17. The cylindrical guide 85 fixes in position against the wall 19 a rubber or similar bumper 87 against which the extension 75 seats, as in Figure 1, when the parts are in the normal off positions.

The rod 42 (Figure 2) is threaded at its extremity for reception within a nut 90 flanged as at 91 for engagment with the adjacent end of the master cylinder plunger 92. The adjacent extremity of the cylindrical extension 36 is normally slightly spaced on the flange 91 as shown in Figure 2. Through this space the chamber 48 communicates with a chamber 93 formed within the hub portion of the casing section 16. The bearing and sealing unit 37 includes a bearing 94 radially slotted as at 95 for the free communication of the chambers 48 and 93. The latter chamber communicates through stamped grooves 96 formed in the casing section 16 with an annular chamber 97 formed around the adjacent end of the master cylinder and communicating with the atmosphere through an annular air cleaner 98. Thus it will be apparent that atmospheric pressure is always present around the rod 42 and in the grooves 54 and chambers 55 and 56.

The extension 75 and guide 85 are radially slotted as at 100 for the projection therethrough of one end of a valve operating lever 101, the upper end of which is pivotally connected as at 102 to the valve operating rod 77. Intermediate its ends the lever 101 is pivotally connected as at 103 to a push rod 104, extending through a boot 105 and through an opening 106 in the casing section 17. The push rod 104 is pivoted as at 107 to the brake pedal 11. The boot 105 is provided with subtending rings 108.

Novel means is provided for pivoting the lever 101 within the casing section 17 to permit the axis of the pivot 102 to travel linearly with the valve operating rod 77. In practice, the lever 101 comprises a pair of spaced parallel lever arms 110 as viewed in Figure 4. Between the lower ends of such lever arms is arranged a roller 111 mounted on a pin 112 riveted to the lever arms 110. A positioning bracket 113 is welded in position to the casing section 27 and is provided with an upper slot 114 through which the lower ends of the lever arms 110 extend as clearly shown in Figures 2 and 4. The roller 111 operates against a vertical wall 115 forming a part of the bracket 113. Torsion springs 116 are arranged beneath the top of the bracket 113 and are provided with lower arms 117 shaped to fit the adjacent portions of the casing section 17. The springs 116 further include upper arms 118 bearing against the roller 111 to exert a force upwardly and to the left in Figure 2. The springs 116 thereby maintain the roller in engagement with the bracket wall 115 and counterbalance the weight of the lever 101 and associated elements. It is obvious that the roller 111 is free to move vertically to allow the axis of the pin 102 to travel horizontally as the lever 101 turns about the axis of the pin 112, and the counterbalancing action of the spring arms 118 eliminates any application of lateral forces between the valve operating rod 77 and the bearing 76.

*Operation*

The parts normally occupy the positions shown in Figures 2 and 3. The valve 60 (Figure 3) will be closed, thus cutting off the atmospheric chamber 56 from the annular space surrounding the valve seat 78, which space communicates with the interior of the casing section 17 through notch 83 and slots 100. Since the valve seat 78 is disengaged from the valve 60, the chamber within the casing section 17, which is the working chamber of the motor, will communicate with the source of vacuum through the passage 65 leading into the vacuum chamber 66. The latter chamber is in constant communication with the vacuum source as described above.

The mechanism is operated by depressing the brake pedal 11 to effect movement of the push rod 104 to the left in Figure 2, movement thus being transmitted through the pivot 102 to the valve operating rod 77. With the lever shown, it will be apparent that the rod 77 will move approximately twice the distance of the push rod 104. Initial movement of the rod 77 brings the valve seat 78 into engagement with the valve 60 and also moves the rib 52 (Figure 3) into contact with the reaction block 41. The valve elements will now be in lap position with the working chamber of the motor disconnected from the source of vacuum at the valve seat 78. Slight additional movement of the rod 77 causes the valve seat 78 to displace the valve 60 from the valve seat 70, thus admitting air from the chamber 56 around valve seat 70 and through slot 83 and grooves 100 into the working chamber of the motor. This establishes differential pressure on opposite sides of the pressure responsive unit 22, whereupon the latter starts to move to the left to effect operation of the master cylinder plunger 92.

Resistance to movement of the rod 77 during the initial operation referred to is determined by the tension of the relatively light spring 80 plus the resistance to movement of the rib 52 into the body of the reaction block 41. The limited deformation of the block 41 by the rib 52 results in an initial light resistance and reaction against the valve operating rod 77 and hence against the brake pedal 11. It will be apparent, of course, that the embedding of the rib 52 in the block 41 takes place only after the valve operation has taken place slightly beyond the lap position.

Later in the operation of the mechanism, particularly when resistance to movement of the tubular member 36 and the pressure responsive unit 22 takes place incident to the building up of pressure in the master cylinder, the full area of the left-hand end of the reaction ring 51 will engage the block 41, thus providing in the second stage of brake operation a highly desirable second stage of heavier pedal reaction.

Forces are transmitted to the master cylinder piston by the flange 91 of the nut 90 as delivered thereto by the rod 42. Forces are delivered to the rod 42 from the pressure responsive unit through engagement of the flange 50 and reaction ring 51 against the block 41. With the full area of the left-hand end of the reaction ring 51 engaging the block 41, the pedal effort applied to the master cylinder plunger is represented by the area of the ring 51 in engagement with the block 41, the power output being determined by the area of the flange 43 in engagement with the block 41. Relative areas of the surfaces engaging the block 41 may be varied to predetermine the proportion of the work performed by the operator and the degree of reaction transmitted to the brake pedal. The spring 46 biases the flange 43 toward the right in Figure 3 to maintain it in engagement with the block 41 and to maintain the opposite face of the block in engagement with the flange 50.

The valve mechanism provides for a perfect followup action of the pressure responsive unit 22 relative to the brake pedal, and it will be apparent that the travel of the pressure responsive unit and the elements associated therewith will correspond to the travel of the master cylinder plunger 92. The arrangement of parts illustrated permits the use of a conventional master cylinder with a booster mechanism wherein the pedal travel is reduced with respect to conventional systems, movement of the push rod 104 being multiplied approximately by two by the lever mechanism employed. Thus, a low pedal 11 may be employed with the pedal pad partaking of relatively limited movement.

It will be apparent that the pivot pin 102 partakes of linear movement with the valve operating rod 77 whereas the lever 101 turns about the axis of the pin 112. The pin 102 thus normally would tend to have a vertical component of movement as the lever operates, and this is compensated for by the mounting of the lower end of the lever 101. The spring arms 118 exert an angular force upwardly and to the left in Figure 2 to maintain the roller 111 in engagement with the bracket wall 115. The roller 111 thus partakes of slight rolling movement over the inner face of the wall 115 to permit the pin 102 to partake of the necessary rectilinear movement for operating the valve mechanism. The spring arms 118 also provides a vertical component of force to counterbalance the weight of the lever 101 and the inner end of the push rod 104, thus eliminating any transverse forces on the push rod 77 which might tend to cause it to bind in the bearing flange 76. Thus, the valve operating rod 77 moves very freely without frictional resistance.

In prior constructions employing a motion multiplying lever between a pedal push rod and a valve operating rod in an apparatus of this character, the lever mechanism has been supported by a bracket interposed between the motor and the fire wall. This was disadvantageous for two reasons. In the first place it multiplies the overall length of the unit and as is well known, there is limited space available in motor vehicles for the installation of booster mechanisms. The present construction therefore reduces the overall length of the unit and eliminates the necessity for the use of a lever supporting bracket. The arrangement also eliminates the presence of atmospheric pressure acting on the control piston, thus obviating the necessity for the static balancing of any of the valve parts, thus consequently eliminating the use of a sliding or diaphragm type seal. The valve operating rod 77 terminates short of the end wall of the casing section 17 instead of projecting therethrough in sealed relation as is usually necessary, as suggested above. The only opening in the casing section 17 is the opening 106, and since the rod 104 is pivoted to the lever 101, it is unnecessary to provide a sliding seal for the rod 104, the use of the convolute boot 105 thus being permitted. The working chamber of the motor is subjected normally to vacuum, while the outer surface of the boot 105 is always open to atmospheric pressure. The subtending rings 108 support the boot 105 against collapsing when vacuum is present in the working chamber of the motor, the boot 105 acting as an effective frictionless seal between the motor working chamber and the atmosphere.

It is to be understood that the form of the invention illustrated and described is to be taken as a preferred example of the same and that various changes in shape, size or arrangement of parts may be made as do not depart from the spirit of the invention or the scope of the appended claims.

I claim:

1. A motor mechanism comprising a casing, a pressure responsive unit therein cooperating with said casing to form a variable pressure chamber, a coaxial valve mechanism carried by said pressure responsive unit and normally connecting said chamber to one source of pressure and operable for connecting such chamber to a different source of pressure to move said pressure responsive unit, said valve mechanism comprising a valve operating member axially slidable in said pressure responsive unit, motion multiplying lever means within said casing having one end connected to said valve operating member and having its other end supported by said casing, and means operable externally of said casing and projecting thereinto for delivering forces to said lever means intermediate the ends thereof.

2. A motor mechanism comprising a casing, a pressure responsive unit therein cooperating with said casing to form a variable pressure chamber, a coaxial valve mechanism carried by said pressure responsive unit and normally connecting said chamber to one source of pressure and operable for connecting such chamber to a different source of pressure to move said pressure responsive unit, said valve mechanism comprising a valve operating member axially slidable in said pressure responsive unit, motion multiplying lever means within said casing having one end connected to said valve operating member, means within said casing and carried thereby supporting the other end of said lever means for pivoted movement and for providing for bodily movement of said lever means to accommodate it to the axial movement of said valve operating member, and means for transmitting force to said lever means intermediate the ends thereof to operate such means and move said valve operating member.

3. A motor mechanism comprising a casing, a pressure responsive unit therein cooperating with said casing to form a variable pressure chamber, a coaxial valve mechanism carried by said pressure responsive unit and normally connecting such chamber to one source of pressure and operable for connecting such chamber to a different source of pressure to move said pressure responsive unit, said valve mechanism comprising a valve operating member axially slidable in said pressure responsive unit, motion multiplying lever means extending generally transversely of the axis of said pressure responsive unit and arranged in said variable pressure chamber, pivot means connecting one end of said lever means to said valve operating member, means carried by said casing therewithin for supporting the other end of said lever means for rocking movement on a pivot axis parallel to the axis of said pivot means and for generally end-wise bodily movement of said lever means to provide for rectilinear movement of said pivot means to operate said valve operating member, and means for delivering force to said lever means intermediate the ends thereof for operating such means and for moving said valve operating member.

4. A motor mechanism according to claim 3 wherein said means for transmitting force to said lever means comprises a push rod having an inner end within said casing pivotally connected to said lever means intermediate the ends thereof, said push rod projecting from said casing, and a flexible sealing boot connected between said casing and said push rod.

5. A motor mechanism comprising a casing, a pressure responsive unit therein cooperating with said casing to form a variable pressure chamber, a coaxial valve mechanism carried by said pressure responsive unit and normally connecting said chamber to one source of pressure and operable for connecting such chamber to a different source of pressure to move said pressure responsive unit, said valve mechanism comprising a valve operating member axially slidable in said pressure responsive unit, motion multiplying lever means extending generally transversely of the axis of said pressure responsive unit and arranged in said variable pressure chamber, pivot means connecting one end of said lever means to said valve operating member, a bracket carried by said casing within said variable pressure chamber, a roller carried by the other end of said lever means and about the axis of which said lever means is adapted to turn, said bracket having a surface perpendicular to the axis of said pressure responsive unit and over which said roller is adapted to roll toward and away from said axis to adapt the axis of said pivot means for rectilinear movement with said valve operating member, and means for delivering force to said lever means to move the first named end thereof and effect movement of said valve operating member.

6. A motor mechanism according to claim 5 wherein said means for delivering force to said lever means comprises a push rod having an inner end pivotally connected to said lever means intermediate the ends thereof, said casing having an opening through which said push rod projects to a point externally of said casing, and a flexible sealing boot connected at one end to said casing and surrounding said opening and having its other end connected to said push rod.

7. A motor mechanism comprising a casing, a pressure responsive unit forming with said casing a variable pressure chamber, a valve mechanism carried by said pressure responsive unit coaxially thereof and normally connecting said variable pressure chamber to a source of low pressure, a valve operating member connected to said valve mechanism and movable coaxially of said pressure responsive unit for connecting said variable pressure chamber to a source of higher pressure, said casing having an end wall forming a part of said variable pressure chamber and having a single opening offset from the axis of said pressure responsive unit, said valve operating member terminating in spaced relation to said wall, a valve operating lever within said variable pressure chamber pivotally connected at one end to said valve operating member and having its other end supported for pivotal movement by said casing, means providing for the shifting of said lever to allow the pivot axis of the connection of the first named end of said lever to move rectilinearly with said valve operating member, a push rod projecting through said opening and pivotally connected to said lever intermediate the ends thereof, and flexible sealing means connected to said rod and to said casing around said opening to seal said variable pressure chamber to the atmosphere.

8. A motor mechanism according to claim 7 wherein said means for providing for the shifting of said lever comprises a bracket carried by said casing within said variable pressure chamber, said other end of said lever being provided with a roller, said bracket having a surface over which said roller moves to provide for bodily shifting movement of said lever during movement thereof.

9. A motor mechanism according to claim 7 wherein said means for providing for the shifting of said lever comprises a bracket carried by said casing within said variable pressure chamber, said other end of said lever being provided with a roller, said bracket having a surface over which said roller moves to provide for bodily shifting movement of said lever during movement thereof, said lever extending generally transversely of the axis of said pressure responsive unit and depending from the pivotal connection of said lever with said valve operating member, and means for counterbalancing the weight of said lever and the adjacent end of said push rod to eliminate the transmission of lateral forces to said valve operating member.

10. A motor mechanism according to claim 7 wherein said means for providing for the shifting of said lever comprises a bracket carried by said casing within said variable pressure chamber, said other end of said lever being provided with a roller, said bracket having a surface over which said roller moves to provide for bodily shifting movement of said lever during movement thereof, said lever extending generally transversely of the axis of said pressure responsive unit and depending from the pivotal connection of said lever with said valve operating member, and a spring carried by said casing and having an arm engaging said roller to exert thereagainst a force having one component for maintaining said roller in engagement with said surface of said bracket and another component counter-balancing the weight of said lever and the adjacent end of said push rod to eliminate the transmission to said valve operating member of forces acting at an angle to the axis of said pressure responsive unit.

11. A motor mechanism comprising a casing, a pressure responsive unit forming with said casing a variable pressure chamber, a valve mechanism carried by said pressure responsive unit coaxially thereof and normally connecting said variable pressure chamber to a source of low pressure, a valve operating member connected to said valve mechanism and movable coaxially of said pressure responsive unit for connecting said variable pressure chamber to a source of higher pressure, said casing having an end wall forming a part of said variable pressure chamber and having a single opening offset from the axis of said pressure responsive unit, said valve operating member terminating in spaced relation to said wall, a valve operating lever within said variable pressure chamber pivotally connected at one end to said valve operating member and having its other end supported for pivotal movement by said casing, means providing for the shifting of said lever to allow the pivot axis of the connection of the first named end of said lever to move rectilinearly with said valve operating member, a push rod projecting through said opening and pivotally connected to said lever intermediate the ends thereof, and an axially extensible and contractible boot connected at one end to said casing in sealing relation thereto around said opening and having its other end surrounding said push rod in sealed relation thereto, said boot having therein at least one subtending ring to prevent the collapsing thereof.

12. A motor mechanism according to claim 11 provided with means for supporting said other end of said lever in said variable pressure chamber, such means comprising a roller providing a pivot axis parallel to the pivot axis of the pivotal connection of the first named end of said lever to said valve operating member, said lever extending transversely of the axis of said pressure responsive unit, said last named means further comprising a bracket having a face perpendicular to the axis of said pressure responsive unit and over which said roller is adapted to move to provide for linear movement of the pivotal connection of the first named end of said lever coaxial with said pressure responsive unit.

13. A motor mechanism according to claim 11 provided with means for supporting said other end of said lever in said variable pressure chamber, such means comprising a roller providing a pivot axis parallel to the pivot axis of the pivotal connection of the first named end of said lever to said valve operating member, said lever extending transversely of the axis of said pressure responsive unit, said last named means further comprising a bracket having a face perpendicular to the axis of said pressure responsive unit and over which said roller is adapted to move to provide for linear movement of the pivotal connection of the first named end of said lever coaxial with said pressure responsive unit, said lever extending vertically downwardly from the pivotal connection of the first named end of said lever with said valve operating member, and means for counterbalancing the weight of said lever to eliminate the transmission to said valve operating member of forces transverse to the axis of said pressure responsive unit.

14. A motor mechanism according to claim 11 provided with means for supporting said other end of said lever in said variable pressure chamber, such means comprising a roller providing a pivot axis parallel to the pivot axis of the pivotal connection of the first named end of said lever to said valve operating member, said lever extending transversely of the axis of said pressure responsive unit, said last named means further comprising a bracket having a face perpendicular to the axis of said pressure responsive unit and over which said roller is adapted to move to provide for linear movement of the pivotal connection of the first named end of said lever coaxial with said pressure responsive unit, said lever extending vertically downwardly from the pivotal connection of the first named end of said lever with said valve operating member, and a spring carried by said casing therewithin and provided with a resilient arm engaging said roller and exerting thereagainst a force having two components one of which maintains said roller in engagement with said face of said bracket and the other of which acts vertically to counterbalance the weight of said lever.

References Cited in the file of this patent

UNITED STATES PATENTS

| | | |
|---|---|---|
| 2,472,695 | Chouings | June 7, 1949 |
| 2,766,732 | Schultz | Oct. 16, 1956 |
| 2,953,120 | Ayers | Sept. 20, 1960 |

FOREIGN PATENTS

| | | |
|---|---|---|
| 733,271 | Germany | Mar. 23, 1943 |
| 1,006,737 | Germany | Apr. 18, 1957 |